United States Patent Office 3,466,269
Patented Sept. 9, 1969

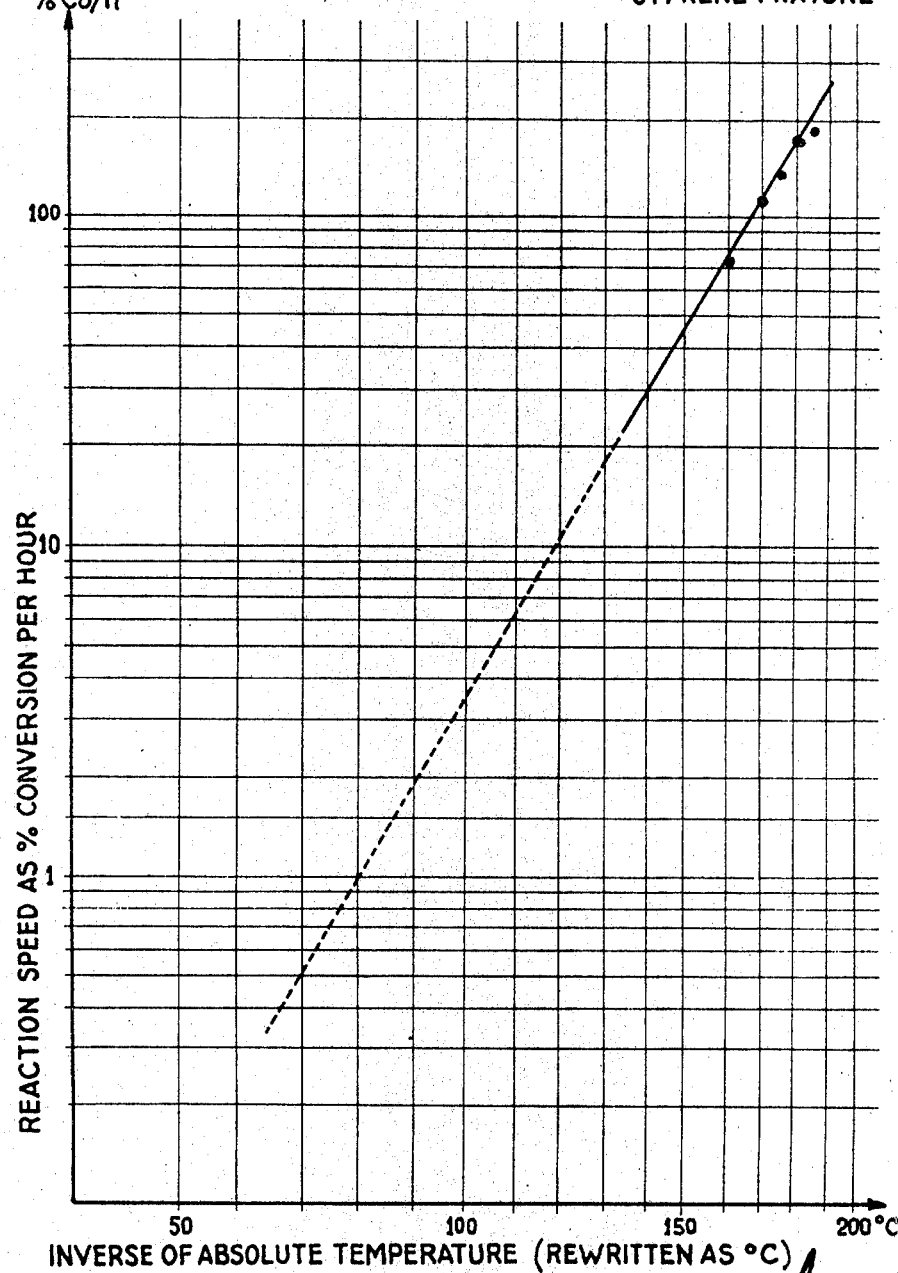

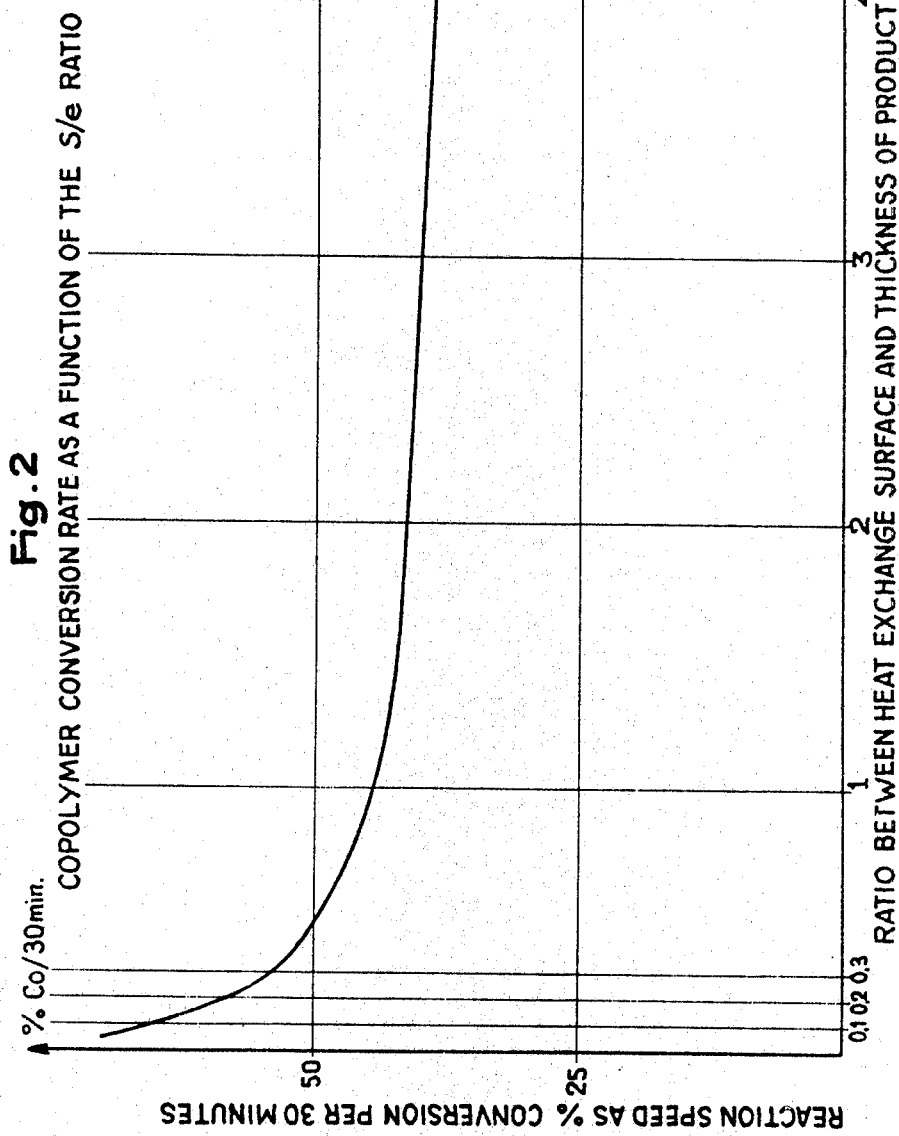

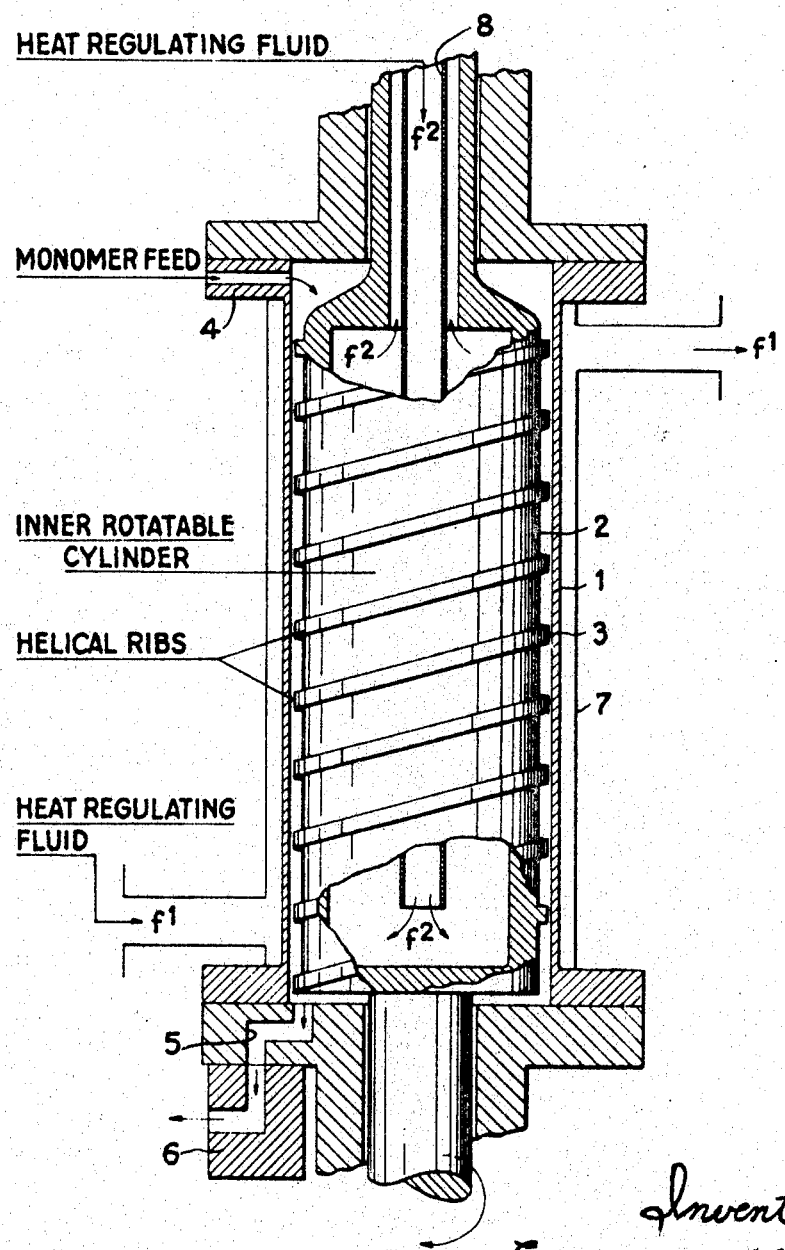

3,466,269
PROCESS FOR CONTINUOUS MASS POLYMERIZATION OF STYRENE AND METHYL METHACRYLATE
Ernest P. Fivel, Lyon, Rhone, France, assignor to Plastugil (Plastique et Elastomeres Ugine-Progil), Lyon, France, a French body corporate
Continuation-in-part of application Ser. No. 495,436, Oct. 13, 1965. This application Aug. 2, 1968, Ser. No. 749,657
Claims priority, application France, Oct. 20, 1964, 991,999
Int. Cl. C08f 19/10, 1/04, 1/02
U.S. Cl. 260—86.7          4 Claims

ABSTRACT OF THE DISCLOSURE

Styrene and methyl methacrylate are continuously copolymerized at 170–190° C. in the absence of a catalyst to give a high conversion of a homogeneous product having a narrow molecular weight distribution and a narrow chemical composition. The heat of reaction is controlled by lamellar flow of the monomer mixture thru the annular space between two concentric cylindrical diathermic walls, the space between the walls being defined by a critical ratio of total heat exchanging surface to thickness of the monomer mixture.

---

The present invention relates to the copolymerization of styrene and methyl methacrylate into improved copolymers.

This application is a continuation-in-part of copending application Ser. No. 495,436, filed Oct. 13, 1965, now abandoned.

The invention has for its object to provide a process for continuous mass polymerization of a uniform mixture of styrene and methyl methacrylate, with a limited although high conversion rate of the monomers. This copolymerization is carried out in the absence of any initiator, activator, modifying agent, catalyst or diluent, without any additive, merely by the action of heat. The reaction is effected in a single pass at a high constant temperature, with a high reaction speed due to this temperature and with a high conversion rate.

The copolymers thus obtained are particularly well suited for their further uses such as the moulding and extruding of shaped articles.

They have, inter alia, three very interesting properties:

A mean molecular weight, expressed in "$k$-Wert" or $k$ value according to Fikentscher (Cellulose Chemie 13,58 (1932)), perfectly adapted for the further operations of moulding and extruding and comprised between 45 and 55. This is achieved due to the high and constant temperature at which the copolymerization is effected;

A homogeneous and very narrow distribution of this molecular weight resulting from the constancy of the copolymerization temperature;

A homogeneous and very narrow chemical composition of the copolymer resulting from the continuous feeding of a mixture containing constant proportions of the two monomers.

Moreover, the absence of catalyst is an important advantage because its presence or that of its residues in the final copolymer may give rise, during the subsequent working operations, to a partial depolymerization of the copolymer involving superficial defects, a lowering of the mechanical properties and an undesirable yellowing upon aging.

The highly transparent products obstained according to the present process have specially good mechanical properties and working characteristics.

All these results are achieved by the process of the invention which comprises continuously passing between two diathermic walls a uniform mixture of the two monomers to be copolymerized in the form of a thin layer at a high constant temperature comprised between 170° C. and 190° C., during a period of time of about 25 to 90 minutes. The reaction effected in a single pass ensures a limited although very high conversion rate, there being obtained about 70 to 90% of a copolymer having a $k$ value according to Fikentscher comprised between 45. and 55. and a homogeneous and narrow distribution both of the molecular weight and the chemical composition. The copolymer thus formed is thereafter separated from the uncoverted monomers in a volatillization stage.

Styrene-methyl methacrylate copolymers having a high degree of molecular uniformity and homogeneity of chemical composition are already known.

U.S. Patent 3,080,340 discloses copolymers of this type, the copolymerization temperature of which is, however, limited to lower values due to the very great difficulties encounter for controlling the exothermicity of the reaction. The use of a catalyst and a diluent enables operating at a lower temperature while obtaining a more suitable $k$ value, the dangers of the exothermicity being then easier to overcome. These dangers nevertheless exist.

This process can be considered as a continuous process with a very low conversion rate in each pass and with a recirculation ensuring a final conversion rate which is higher but nevertheless rather limited. Withdrawal of a portion of the copolymer formed is made at a rate equivalent to the rate of feed of the monomers, so as to keep constant the ratio monomers/copolymer.

Such a process is clearly distinguished from the present process and yields copolymers, the $k$ value of which is higher, owing to the necessity of operating at lower temperatures for controlling the exothermicity and the characteristics of which are less adapted to the subsequent working of the copolymer.

In contradistinction thereto, the exothermicity is fully controlled in the present process operating in a thin layer with a limited but very high conversion rate; the thickness of the layer is expressed by the minimum permissible ratio $S/e$ of the total surface $S$ of thermal exchange to the thickness $e$ of the layer comprised between the two diathermic walls per unit of volume of the reaction mixture, this ratio having a value of at least 0.1 cm.$^{-2}$ in c.g.s. units.

In his prior U.S. Patent 3,141,861, applicant has set forth the advantage of such a copolymerization in a thin layer for styrene and acrylonitrile. The problems involved were, however, quite different.

When copolymerizing styrene and acrylonitrile, acrylonitrile, which is a very reactive compound, is involved quite at the start in the reaction which becomes at once very exothermic.

In the copolymerization of styrene and methyl methacrylate, the conditions are not the same, because methyl methacrylate is a monomer known to be very lazy at the polymerization start, the reaction becoming exothermic only after a sufficient starting period.

It could not be expected therefore that it would be possible to copolymerize styrene and methyl methacrylate like styrene and acrylonitrile, because of the lack of reactivity of methyl methacrylate at the beginning of the reaction and the necessity of operating at a higher temperature, which renders more and more difficult the control of the exothermicity. Nor could it be expected that the copolymer thus obtained would have the advantageous properties and working characteristics which have been observed.

As a matter of fact, it has been found that, surprisingly, it was possible to copolymerize styrene and methyl methacrylate in a thin layer at a high constant temperature in a single pass and with a limited but very high conversion rate, this being accomplished without an activator, initiator, modifier or catalyst—which should have been thought necessary due to the poor reactivity of methyl methacrylate—and also without a diluent—generally considered as indispensable for overcoming the exothermicity when operating at such a high temperature and with such a high conversion rate. Moreover, it has been found that this process—despite its critical conditions—yields copolymers having a very good $k$ value, excellent mechanical and processing properties and very homogeneous and narrow molecular weight distribution and chemical composition.

The copolymerization of styrene and methyl methacrylate appears thus technically different from the teaching of applicant's prior U.S. patent because of the different reactivity characteristics of methyl methacrylate and acrylonitrile. This is especially so as it has been possible, while ensuring a perfect control of the exothermicity and without any additive, to operate at a higher temperature and with a higher conversion rate than in the case of the copolymerization of styrene and acrylonitrile, though starting from a monomer, methyl methacrylate, less reactive than acrylonitrile. Due to this higher reaction temperature, the styrene/methyl methacrylate copolymers have a lower $k$ value than the styrene/acrylonitrile copolymers, which is a definite advantage in this specific case as methyl methacrylate polymers are always more difficult to work than acrylonitrile polymers.

The relative percentages by weight of the monomers in the mixture to be copolymerized may vary within very large limits of from 90 to 10 parts of styrene for 10 to 90 parts of methyl methacrylate. It should, however, be understood that in each given copolymerization operation, the ratio of styrene to methyl methacrylate is kept constant within the above range, so as to obtain a copolymer of constant composition.

This constant mixture of the monomers may be prepared batchwise or continuously and thereafter fed continuously to the process. When it has been decided to prepare a copolymer of given composition at a given temperature, the latter determining the $k$ value, the continuous process is started and the copolymer obtained during the first one or two hours is discarded until the temperature equilibrium is reached.

Thereafter the copolymer has constant properties both as concerns its molecular weight and chemical composition and it can be prepared without any variation in this constancy during a campaign of several months, an automatic control of the manufacturing unit being provided.

It has been necessary for the styrene/methyl methacrylate copolymerization to determine the $k$ value range proper for the subsequent uses of the copolymer, it being understood that the constant temperature selected for the copolymerization corresponds to a specific $k$ value for a given composition of the constant initial mixture of the monomers.

It has also been necessary to determine the proper value of the ratio $S/e$, which in turn enables the thickness of the reaction layer to be defined.

Three examples will now be given corresponding to constant mixtures of the monomers styrene and methyl methacrylate (MMA) in the following respective proportions by weight: 50/50–38/62 and 10/90.

The following table résumés the results obtained.

TABLE I

[Initial copolymerization speed and $k$ value as a function of the temperature]

| T., °C | Styrene/MMA 50/50 | | Styrene/MMA 38/62 | | Styrene/MMA 10/90 | |
|---|---|---|---|---|---|---|
| | Initial speed, percent hour | K value | Initial speed, percent hour | K value | Initial speed, percent hour | K value |
| 160 | 90 | 57 | 72 | 61 | 36 | 69 |
| 170 | 135 | 51 | 112 | 55 | | |
| 175 | 160 | 48 | 130 | 51 | | |
| 180 | 190 | 46 | 170 | 50 | 50 | 55 |
| 185 | | | 182 | 47 | 58 | 52 |
| 190 | | | | | 65 | 49 |

It can be seen from this table that to obtain satisfactory $k$ values, that is $k$ between 55 and 45, reaction temperatures must be selected that entail reaction speeds such that it is necessary to overcome efficiently the exothermicity.

Thus, at 180° C., the concentration in copolymer with respect to the feed increases by 3.1% per minute in the case of the 50/50 styrene/methyl methacrylate mixture. This amounts to saying that for 100 kg. of initial feed of monomers, a continuous elimination of about 420 Kcal. per minute is necessary.

For each mixture to be copolymerized, the kinetic reaction curve can be plotted as a function of the temperature, the inverse of the absolute temperature being plotted as abscissae (the scale being however rewritten as ° C.) and the percentage of copolymer formed per hour (percent Co/h.) being plotted as ordinates according to a logarithmic scale.

FIG. 1 of the accompanying drawing shows this curve plotted in respect of a 62/38 methacrylate-styrene mixture. Making allowances for experimental errors, the curve is a straight line satisfying the formula:

Reaction speed $$(\text{Co percent/h.}) = 10^{10} - \frac{3.52 \times 10^3}{T}$$

in which T is the absolute temperature in ° K.

The reaction is therefore of the first order and the logarithmic straight line represents the process of the reaction under the best heat exchange conditions.

To determine these optimal heat exchange conditions a series of experiments were carried out in varying for a constant copolymerization temperature selected within the aforementioned range (175° C.), the ratio $S/e$ and in determining in each case the conversion rate into copolymer in 30 minutes. The ratio $S/e$ is directly proportional to the inverse square of one length and is thus expressed as cm.$^{-2}$ in c.g.s. units. The following Table II shows the results of these experiments.

Variation in the copolymer conversion rate as a function of the ratio between the heat exchange surface and the thickness of the product at the temperature of 175° C.

TABLE II

| $S/e$, cm.$^{-2}$ | Thickness of the corresponding reactional layer (cm.) | Percent conversion in 30 minutes | Percent conversion per minute |
|---|---|---|---|
| 4 | 0.2 | 39 | 1.3 |
| 1.5 | 1.1 | 42 | 1.4 |
| 1 | 1.4 | 44 | 1.46 |
| 0.7 | 1.73 | 47 | 1.56 |
| 0.4 | 2.25 | 51 | 1.70 |
| 0.3 | 2.55 | 56 | 1.86 |
| 0.2 | 3.20 | 60 | 2 |
| 0.1 | 4.50 | 65 | 2.16 |

FIG. 2 of the accompanying drawing translates the results of this table. The ratio $S/e$ in cm.$^{-2}$ has been plotted as abscissae and the conversion rates in 30 minutes (percent Co/30 min.) are plotted as ordinates.

The minimum allowable ratio $S/e$ can be deduced from this curve. Indeed, this curve comprises a step and a portion which is asymptotic to the axis of the ordinates. In order to have a controlled reaction, it is necessary to avoid operating too distinctly on the asymptotic portion. This correspnods to $S/e \geqslant 0.1$ cm.$^{-2}$, this ratio being preferably 0.2–0.3.

To obtain ratios $S/e$ of this order a suitable polymerization apparatus is constituted by a polymerizer having an annular space for the passage of the monomers adjusted to the appropriate value. Such a polymerizer is shown in longitudinal section with a part cut away in FIG. 3 of the accompanying drawings. It comprises two concentric cylinders 1 and 2, the inner cylinder 2 being rotatable within the cylinder 1 and being provided with a helical thread or rib 3 which causes the mixture of monomers to travel through the annular space between the cylinders. This mixture is injected at 4 and issues from the apparatus at 5. An extracting screw pump 6 is provided if desired. The cylinder 1 is surrounded by a jacket 7 in which a heat regulating fluid circulates in a direction of arrows $f^1$. The cylinder 2 is hollow and it is also possible to inject therein through the pipe 8 heat regulating fluid circulating in the direction of arrows $f^2$. A simple calculation shows that in such an apparatus the ratio $S/e$ is equal to $2/(R-R')^2$ in which R and R' are the radii of the cylinders 1 and 2 respectively.

It is possible to deduce therefrom that $R-R' \leqslant 4.5$ cm. The lower limit of the space $R-R'$ is determined by practical considerations since it is hardly possible to descend below 0.2 cm. If desired, a plurality of detachable inner cylinders could be employed whereby a series of annular spaces or intervals between 4.5 and 0.2 cm. can be obtained.

As has been mentioned hereinbefore, there is obtained at the outlet of the apparatus a polymerization conversion rate of 70 to 90%. Thereafter at the outlet of the apparatus the product is fed to a volatization apparatus of conventional type. The excess monomers distilled off are sent back to the polymerizer while the polymer is extracted.

The following examples illustrates the invention, it being understood that the invention is not intended to be limited thereby.

Example I

The monomers styrene and methyl methacrylate, in the proportions of 50 and 50 parts by weight respectively, are fed by a metering pump under a pressure of 6 kg./cm.$^2$ to a polymerizer of the type described whose reaction enclosure is constituted by an annular space of 30 mm. The temperature of the reaction mixture is regulated at 170° C. by circulation of a regulating fluid.

By means of an extracting screw located at the outlet of the polymerizer, the time during which the monomers remain in the enclosure of this apparatus is regulated at 37 minutes. The mixture of copolymer and unconverted monomers is fed to the devolatilizing apparatus. The latter operates at 220° C. under a residual pressure of 30 mm. of mercury.

The copolymer is collected at the outlet of the devolatilizing apparatus and it is observed that the content of free monomers is of the order of 0.5%.

The ratio of conversion of the mixture of monomers during this passage time in the reaction enclosure was found to be 83% of copolymer formed, such a conversion ratio corresponding to a copolymer formation rate of 2.25%/minute.

The $k$ value according to Fikentscher, which is characteristic of the molecular weight, was found to be 51.

The copolymer obtained is colorless, transparent, clear and possesses satisfactory mechanical properties.

Example II

The monomers styrene and methyl methacrylate, in the proportions of 38 and 62 parts by weight respectively, are fed by a metering pump to a polymerizer of the type described whose reaction enclosure is constituted by an annular space of 20 mm. The temperature of the reaction mixture is regulated at 175° C. by circulation of a regulating fluid. By means of an extracting screw located at the outlet of the polymerizer the time during which the unconverted monomers remain in the apparatus is regulated at 48 minutes.

The devolatilizing apparatus operates at 220° C. under a residual pressure of 30 mm. of mercury. The copolymer is collected at the outlet of the devolatilizing apparatus and it is observed that the content of free monomers is of the order of 0.5%. The ratio of conversion of the mixture of monomers during this passage time in the reaction enclosure was found to be 78% of formed copolymer, such a conversion ratio corresponding to a copolymer formation rate of 1.63%/minute.

The $k$ value according to Fikentscher, which is a characteristic of the molecular weight, was found to be 51.

The copolymer obtained is colourless, transparent, clear and possesses satisfactory mechanical properties.

Example III

The monomers styrene and methyl methacrylate, in the proportions of 10 and 90 parts by weight respectively, are fed by a metering pump under a pressure of 14 kg./cm.$^2$ to a polymerizer of the type described whose reaction enclosure is constituted by an annular space of 30 mm. The temperature of the reaction mixture is regulated at 185° C. by circulation of a regulating fluid. By means of an extracting screw located at the outlet of the polymerizer, the time during which the monomers remain in the enclosure of the apparatus is regulated at 85 minutes.

The mixture of copolymer and unconverted monomers is fed to the devolatilizing apparatus, which operates at 220° C. under a residual pressure of 30 mm. of mercury.

The copolymer is collected at the outlet of the devolatilizing apparatus and it is observed that the content of free monomers is of the order of 0.5%. The ratio of conversion of the mixture of monomers during this passage time in the reaction enclosure was found to be 81% of formed copolymer, this conversion ratio corresponding to a copolymer formation rate of 0.96%/minute.

The copolymer obtained is colourless, transparent, clear and has satisfactory mechanical properties.

The $k$ value according to Fikentscher, which is characteristic of the molecular weight, was found to be 52.

It must be understood that the invention is not intended to be limited by the modes of operation described, which have been given merely by way of examples.

Having now described my invention what I claim as new and desire to secure by Letters Patent is:

1. Process of copolymerizing monomeric styrene and methyl methacrylate in the range from 10 to 90 parts by weight of styrene and from 90 to 10 parts by weight of methyl methacrylate in a total of 100 parts by weight of the two monomers, comprising continuously passing a mixture consisting of the two monomers in a constant relative proportion within said range between two diathermic walls during a reaction time of about 25 to 90 minutes in indirect heat exchange relation with a heat regulating medium so as to maintain the reaction temperature of said mixture at a substantially constant value comprised between about 170° and 190° C., said diathermic walls comprising concentric cylinders to provide an annular space therebetween in which said mixture is received, said space being between about 0.2 and 4.5 cm. in radial thickness, the polymerization taking place in the absence of a catalyst, the ratio $S/e$ between the heat exchange surface S of the two diathermic walls and the thickness $e$ of the mixture of styrene and methyl methacrylate passing therebetween per unit volume of said mixture, having a value of at least 0.1 cm.$^{-2}$ in c.g.s. units, collecting at the output end of the diathermic walls a mixture comprising 70 to 90% of styrene-methyl methacrylate copolymer, the remainder being composed of styrene and methyl methacrylate which have not reacted, and separating the copolymer from the last-mentioned mixture, said copolymer having a mean molecular weight expressed by the $k$ value according to Fikentscher comprised between 45 and 55, a homogeneous and very narrow distribution of this molecular weight and a homogeneous and very narrow chemical composition.

2. Process of copolymerizing monomeric styrene and methyl methacrylate in the range from 10 to 90 parts by weight of styrene and from 90 to 10 parts by weight of methyl methacrylate in a total of 100 parts by weight of the two monomers, comprising continuously passing a mixture consisting of the two monomers in a constant relative proportion within said range between two diathermic walls during a reaction time of about 25 to 90 minutes in indirect heat exchange relation with a heat regulating medium so as to maintain the reaction temperature of said mixture at a substantially constant value comprised between about 170 and 190° C., said diathermic walls comprising concentric cylinders to provide an annular space therebetween in which said mixture is received, said space being between about 0.2 and 4.5 cm. in radial thickness, the polymerization taking place in the absence of a catalyst, the ratio $S/e$ between the heat exchange surface $S$ of the two diathermic walls and the thickness $e$ of the mixture of styrene and methyl methacrylate passing therebetween per unit volume of said mixture, having a value of between 0.2 and 0.3 cm.$^{-2}$ in c.g.s. units, collecting at the output end of the diathermic walls a mixture comprising 70 to 90% of styrene-methyl methacrylate copolymer, the remainder being composed of styrene and methyl methacrylate which have not reacted, and separating the copolymer from the last-mentioned mixture, said copolymer having a mean molecular weight expressed by the $k$ value according to Fikentscher comprised between 45 and 55, a homogeneous and very narrow distribution of this molecular weight and a homogeneous and very narrow chemical composition.

3. A method for the copolymerization of monomeric styrene and methyl methacrylate in the range from 10 to 90 parts by weight of styrene and from 90 to 10 parts by weight of methyl methacrylate in a total of 100 parts by weight of the two monomers, said method comprising the steps of:

(a) forming a mixture consisting of styrene and methyl methacrylate in a constant relative proportion within said range;

(b) shaping a portion of said mixture into a continuous annular configuration having a thickness in the range from 0.2 to 4.5 centimetres;

(c) continuously feeding said mixture into one end of said annular configuration while withdrawing material from the other end thereof;

(d) continuously contacting both faces of said annular configuration throughout their entire areas to transfer heat away therefrom;

(e) adjusting the rate of heat transfer away from said annular configuration to maintain the temperature of all of said mixture within said configuration including copolymerized portions thereof at a predetermined constant value within the range from 170° C. to 190° C., the polymerization taking place in the absence of a catalyst;

(f) adjusting the rate of said feeding to cause passage of any specific portion of said mixture from said one end of said configuration to the other end thereof in a period of from about 25 to 90 minutes whereby about 70 to 90% of said specific portions is reacted to produce a copolymer having a mean molecular weight the $k$ value of which measured in Fikentscher units is within the range from 45 to 55; and (g) recovering the untreated reactants from said material withdrawn from said other end of said configuration.

4. A method according to claim 3, wherein said configuration is in the form of a cylindrical helix.

References Cited

UNITED STATES PATENTS

| | | | |
|---|---|---|---|
| 3,080,348 | 3/1963 | Lang et al. | 260—86.7 |
| 3,141,868 | 7/1964 | Fivel | 260—85.5 |
| 3,234,303 | 2/1966 | Bild et al. | 260—876 |

FOREIGN PATENTS

| | | |
|---|---|---|
| 1,225,103 | 2/1960 | France. |
| 1,478,150 | 3/1967 | France. |
| 1,141,455 | 12/1962 | Germany. |
| 287,223 | 3/1953 | Switzerland. |

JOSEPH L. SOFER, Primary Examiner

J. C. HAIGHT, Assistant Examiner

U.S. Cl. X.R.

260—85.6, 86.1